(12) United States Patent  (10) Patent No.: US 7,651,400 B2
Yamazaki  (45) Date of Patent: Jan. 26, 2010

(54) CONSTANT VELOCITY UNIVERSAL JOINT AND INNER MEMBER THEREOF

(75) Inventor: Kisao Yamazaki, Iwata (JP)

(73) Assignee: NTN Corporation, Osaka-fu (JP)

( * ) Notice: Subject to any disclaimer, the term of this patent is extended or adjusted under 35 U.S.C. 154(b) by 162 days.

(21) Appl. No.: 11/491,951

(22) Filed: Jul. 25, 2006

(65) Prior Publication Data

US 2007/0037626 A1 Feb. 15, 2007

(30) Foreign Application Priority Data

Jul. 28, 2005 (JP) ............................ 2005-219387

(51) Int. Cl.
 *F16D 3/223* (2006.01)
(52) U.S. Cl. ........................ 464/182; 464/906; 148/639; 403/359.6
(58) Field of Classification Search ................ 464/140, 464/144–146, 182, 906; 148/639, 902; 403/359.1, 403/359.6
See application file for complete search history.

(56) References Cited

U.S. PATENT DOCUMENTS 4,215,259 A * 7/1980 Rudd et al. ................. 219/635
5,501,639 A * 3/1996 Krude ........................ 464/145
5,632,568 A   5/1997 Fechter
5,666,287 A * 9/1997 Furumura et al. ............. 702/35
5,779,551 A   7/1998 Stall et al.
5,799,385 A   9/1998 Fechter
6,135,891 A * 10/2000 Sone et al. .................. 464/145
6,227,979 B1 * 5/2001 Yamamoto et al. .......... 464/145
2003/0130048 A1  7/2003 Fuhrmann et al.
2006/0188328 A1  8/2006 Gutierrez et al.

FOREIGN PATENT DOCUMENTS

WO  2005/106059  11/2005
WO  2006/074683  7/2006

* cited by examiner

*Primary Examiner*—Greg Binda
(74) *Attorney, Agent, or Firm*—Wenderoth, Lind & Ponack L.L.P.

(57) ABSTRACT

An inner ring is configured to simultaneously ensure the strength thereof and the dimensional accuracy of a female spline portion of a shaft hole thereof in the case where the female spline portion is subjected to heat treatment. Also it is configured to suppress the backlash of spline fit with a shaft. The inner ring is mounted in a constant velocity universal joint for transmitting torque while the inner ring is allowed to be angularly displaced relative to an outer ring and is spline-fitted to a shaft inserted into a shaft hole formed through the inner ring. The inner ring has a hardened layer by means of heat treatment which is formed only in an axial central portion of the shaft hole, but is not formed in remaining inner diameter surface other than the axial central portion.

12 Claims, 5 Drawing Sheets

CONSTANT VELOCITY UNIVERSAL JOINT AND INNER MEMBER THEREOF

BACKGROUND OF THE INVENTION

1. Field of the Invention

The present invention relates to a fixed-type or a sliding-type constant velocity universal joint which is employed in a power transmission system of an automobile or various industrial machines and is incorporated in a drive shaft or a propeller shaft employed in, for example, a 4WD vehicle or an FR vehicle. The invention also relates to an inner member constituting part of the constant velocity universal joint.

2. Description of the Related Art

A fixed-type constant velocity universal joint (a Rzeppa type constant velocity universal joint: BJ) has been employed as a connection joint for a drive shaft or the like of an automobile. For example, such a universal joint comprises: an outer ring serving as an outer member and having curved track grooves formed axially in its spherical inner diameter surface; an inner ring serving as an inner member and having curved track grooves formed axially in its spherical outside diameter surface; a plurality of torque transmission balls arranged in respective ball tracks each constituted by one of the track grooves of the outer ring in combination with the corresponding track groove of the inner ring; and a retainer having pockets for holding these balls. The plurality of balls are retained in the respective pockets formed in the retainer and are arranged at regular intervals in the circumferential direction.

When this constant velocity universal joint is employed in a drive shaft, a shaft portion (a driven shaft) integrally extending from one end of the outer ring in the axial direction thereof is connected to a wheel-bearing apparatus, and a shaft (a driving shaft) spline-fitted into a shaft hole of the inner ring is connected to a sliding-type constant velocity universal joint. Even when the outer ring and the inner ring are angularly displaced between the respective two axes of the shaft portion of the outer ring and the shaft in the inner ring, each of the balls retained in the pockets of the retainer is always held in a plane bisecting an operational angle at any operational angle. Therefore, the constant velocity of the joint is ensured. Here, the operational angle refers to an angle formed by the shaft portion of the outer ring and the shaft of the inner ring.

As for the inner ring of a constant velocity universal joint, in order to increase the strength, a hardened layer is formed through heat treatment to extend the life time of the inner ring, whereby the product lifetime of the constant velocity universal joint is extended (see, for example, Japanese Patent Laid-Open Publication No. 2000-227123).

Generally, the inner ring of the abovementioned constant velocity universal joint is formed of a steel material capable of being hardened by quenching. Furthermore, in this inner ring, a hardened layer 121 by means of induction hardening is formed on an outside diameter surface 104 contacting the inner diameter surface of the retainer and on track grooves 105 on which a high contact pressure is exerted due to the rolling motion of the ball, as shown in FIGS. 8 and 9.

Here, FIG. 8 is a cross-sectional view taken along is the line F-F in FIG. 9, and FIG. 9 is a cross-sectional view taken along the line E-O-E in FIG. 8. In FIG. 9, hatching for indicating the cross-sections is omitted, and a portion in which the hardened layer 121 is formed is hatched.

A female spline portion 123 is formed axially in the inner diameter surface of a shaft hole 122 of an inner ring 106, and a male spline portion is formed axially in the outside diameter surface of a shaft (not shown). By inserting the shaft into the shaft hole 122 of the inner ring 106, the male spline portion of the shaft is brought into engagement with the female spline portion 123 of the inner ring 106, whereby the shaft is fixedly connected to the inner ring 106 such that torque can be transmitted therebetween.

Generally, a hardened layer by means of heat treatment is not formed in the female spline portion 123 of the shaft hole 122 of the inner ring 106 into which the shaft is spline-fitted. This is because when a deep hardened layer by means of induction quenching is formed in the female spline portion 123 of the inner ring 106, ensuring the accuracy of the spline fit becomes difficult since deformation occurs due to the heat treatment.

However, when a comparison is made between the inner ring 106 in which the hardened layer by means of induction quenching is not formed in the female spline portion 123 and an inner ring in which the hardened layer by means of induction quenching is formed in the female spline portion 123 thereof, the strength of the inner ring 106 in which the hardened layer by means of induction quenching is not formed becomes lower than the other.

As discussed above, if the hardened layer by means of induction quenching is formed in the female spline portion 123 of the shaft hole 122 in the inner ring 106, the strength of the inner ring 106 can be ensured. However, in this case, difficulty lies in ensuring the accuracy of the female spline portion 123 since deformation occurs due to the heat treatment. On the other hand, if the hardened layer by means of induction quenching is not formed in the female spline portion 123 of the shaft hole 122 in the inner ring 106, the accuracy of the female spline portion 123 can be ensured, but difficulty lies in enhancing the strength of the inner ring 106.

As described above, depending on whether or not the female spline portion 123 of the shaft hole 122 of the inner ring 106 is subjected to the heat treatment, there are advantages and disadvantages in terms of the strength of the inner ring 106 and the accuracy of the female spline portion 123. However, there is no effective means for providing strength and accuracy at the same time.

Furthermore, in modern automobiles, there is a demand for a drive system having reduced backlash in order to improve the riding comfort of the automobiles. Generally, for the spline fit between the inner ring 106 and the shaft, a twist angle is additionally provided in the male spline potion of the shaft to thereby reduce the amount of backlash of the spline fit between the inner ring 106 and the shaft. However, since the twist angle is asymmetric in directions of twist (two directions corresponding to the forward and backward motions of an automobile), the strength of the shaft varies depending on the load-applied direction of twist torque.

In order to prevent this, it has been proposed that, in a pair of left and right drive shafts employed in an automobile, the direction of twist angle for male spline portions of the shafts is set separately for each of the left and right drive shafts (see, for example, Japanese Utility Model Publication (kokoku) No. Hei. 6-33220). However, if such means is employed, although the same left and right shafts can be employed for production, only the male spline portions have different shapes for the left and right sides, resulting in an increase in the kinds of products. In addition, since it is difficult to visually distinguish the difference in the direction of the twist angle, product management becomes difficult. Moreover, since separate production lines must be provided for the left and right portions, a problem arises in that productivity is lowered.

In order to solve this problem, it has been proposed that the backlash of the spline fit between an inner ring 106 and a shaft is eliminated by providing crowning having a left-right symmetric shape in the male spline portion of the shaft to thereby eliminate the dependency of the strength on the load-applied direction of twist torque (see, for example, Japanese Patent Laid-Open Publications Nos. 2001-343023, 2001-287122, and 2001-323920). However, these means are employed for a shaft as in Japanese Utility Model Publication (kokoku) No. Hei. 6-33220 mentioned above. Therefore, there is no means for solving the problems for the female spline portion 123 of the inner ring 106.

SUMMARY OF THE INVENTION

It is an object of the present invention to simultaneously ensure the strength of an inner member and the dimensional accuracy of a female spline portion of a shaft hole of the inner member in the case where the female spline portion is subjected to heat treatment and to suppress the backlash of spline fit with a shaft.

The present invention is an inner member which is is mounted in a constant velocity universal joint for transmitting torque while the inner member is allowed to be angularly displaced relative to an outer member and which is spline-fitted to a shaft inserted into a shaft hole formed through the inner member, wherein a hardened layer by means of heat treatment is formed only in an axial central portion of the shaft hole.

In the above configuration, "only in the axial central portion" means that the hardened layer is formed in a central portion in the axial direction and is not formed in both axial side portions other than the central portion in which the hardened layer is formed.

Desirably, the hardened layer is formed by heat treatment by means of induction quenching. The heat treatment by means of induction quenching is preferable since a hardened layer having a large depth can be easily formed in order to enhance the strength of the inner member and since in-line processing can be achieved for a production line. Furthermore, the female spline portion, an outside diameter surface which is to be brought into contact with the inner diameter surface of a retainer, and track grooves for allowing a ball to roll can be subjected to the heat treatment at the same time in one step. Therefore, productivity is superior, resulting in a cost advantage. Moreover, the interference fit of the shaft with respect to the inner ring can be adjusted through the case depth in the hardened layer. Here, the hardened layer can be formed discontinuously along a circumferential direction of the shaft hole. Alternatively, it can be formed over the entire circumference.

A constant velocity universal joint can be constituted by adding, to the inner member having the above configuration, an outer member and a torque transmission member intervening between the inner member and the outer member to transmit torque.

In the structure in which the inner member is spline-fitted to the shaft as in this constant velocity universal joint, if twist torque is applied to the shaft, stress is concentrated on a spline base portion of the shaft which portions serve as a fulcrum for the twist. Furthermore, if a shaft is employed in which a twist angle is additionally provided in the male spline portion for suppressing the occurrence of backlash with the inner member spline-fitted into the shaft, the stress is further concentrated on the spline base portion of the shaft.

The twist strength is lowered due to this stress concentration. Furthermore, when the twist angle is additionally provided, since the twist angle is asymmetric in the directions of twist, the condition of the stress concentration differs depending on the twist direction. Therefore, the strength against twist is large in a particular direction and is low in another particular direction.

Accordingly, in the present invention, the hardened layer by means of heat treatment is formed only in the axial central portion of the shaft hole of the inner member. By subjecting only the axial central portion of the shaft hole to the heat treatment, martensitic transformation induced by the heat treatment occurs in the inner diameter portion of the axial central portion, and the volume thereof is expanded to cause the inner diameter at the female spline portion to decrease. Here, the both axial side portions other than the axial central portion remain as a non-heat treated portion. As described above, only part of the female spline portion is subjected to heat treatment, and the rest remains as a non-heat treated portion. Therefore, the dimensional accuracy of the female spline portion can be ensured.

In the structure in which the inner member is spline-fitted into the shaft, the shaft is press-fitted to the inner member in the axial central portion of the female spline portion which central portion has a smaller inner diameter. In the conventional case, when twist torque is applied to the shaft, stress is concentrated on the spline base portion of the shaft which portion serves as a fulcrum for the twist. However, in the present invention, as a consequence of the press-fit, stress is also concentrated on the axial central portion of the female spline portions in the press-fitted state. Therefore, the stress concentration on the spline base portion of the shaft can be dispersed and relaxed.

Normally, the inner member has a shape having a spherical outside diameter surface, i.e., a shape in which the axial central portion has a large thickness and the both axial side portions have a small thickness. In the conventional case, the stress is concentrated on the spline base portion of the shaft, which portion corresponds to one of the axial side portions having a small thickness. However, in the present invention, since the axial central portion on which the stress is concentrated has the largest thickness, the strength of the inner member can be ensured.

In addition, since the inner diameter is small in the axial central portion of the female spline portion of the inner member, the shaft and the inner member are brought to a press-fitted state in the axial central portion of the inner member. Therefore, the backlash can be eliminated in the spline fit between the inner member and the shaft without additionally providing a twist angle to the shaft.

DETAILED DESCRIPTION OF THE PREFERRED EMBODIMENTS

Hereinafter, the embodiments of the present invention will be described. The embodiments hereinafter exemplify the case in which the invention is applied to a fixed-type (Rzeppa type) constant velocity universal joint (BJ) having eight balls. However, the invention is applicable to other constant velocity universal joints such as a fixed-type (an undercut free type) constant velocity universal joint (UJ), a sliding-type (a cross groove type) constant velocity universal joint (LJ), a sliding-type (a double offset type) constant velocity universal joint (DOJ), and a sliding-type (a tripod type) constant velocity universal joint (TJ). In addition, the invention is applicable to a fixed-type constant velocity universal joint having six balls.

Figure 6:
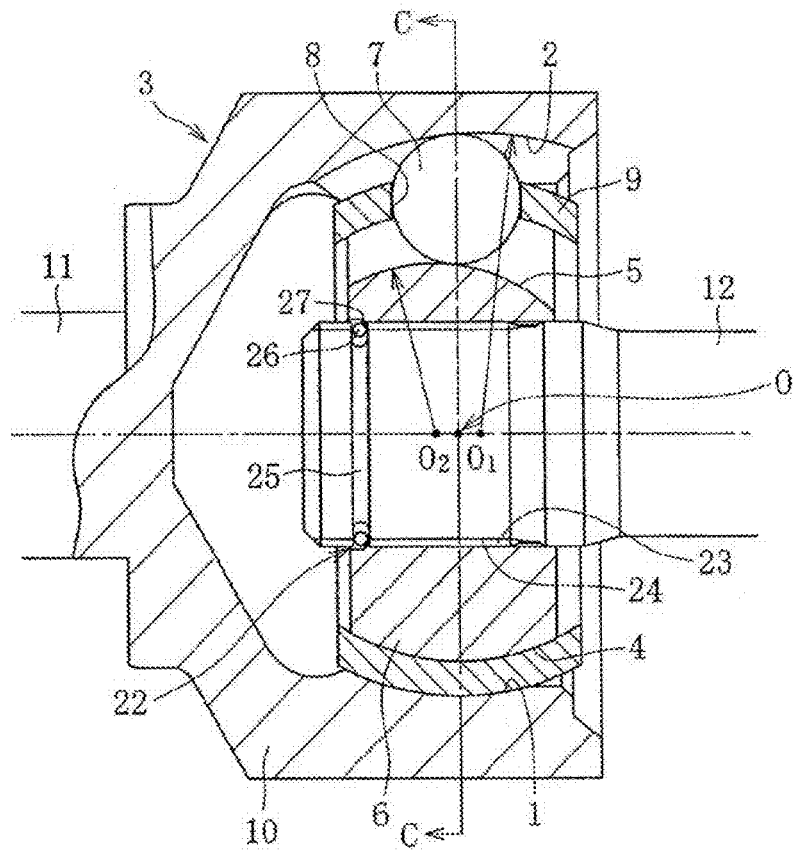
FIG. 6 shows a structural example of a fixed-type constant velocity universal joint and is a cross-sectional view taken along the line D-O-D in FIG. 7.
Figure 7:
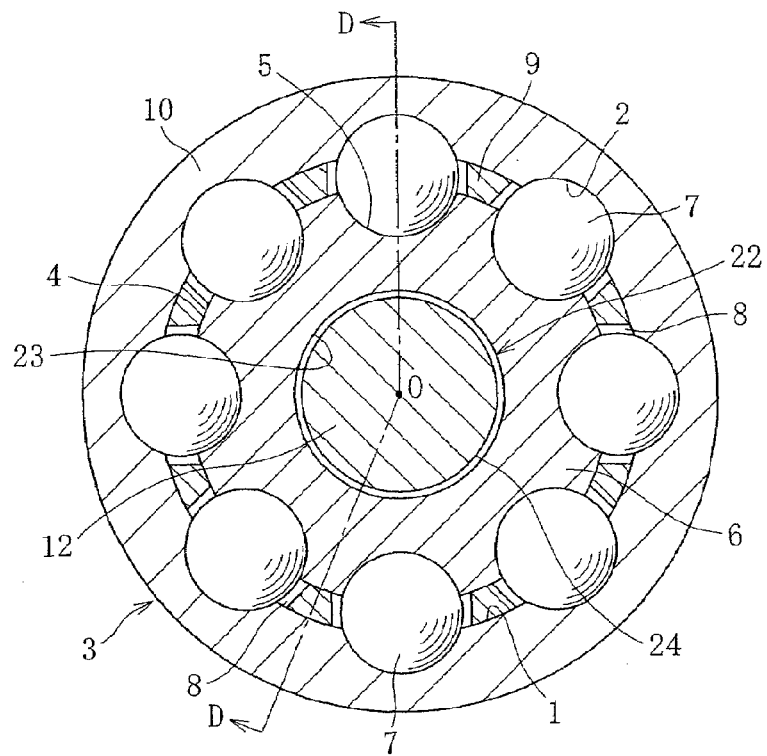
FIG. 7 is a cross-sectional view taken along the line C-C in FIG. 6.
Figure 8:
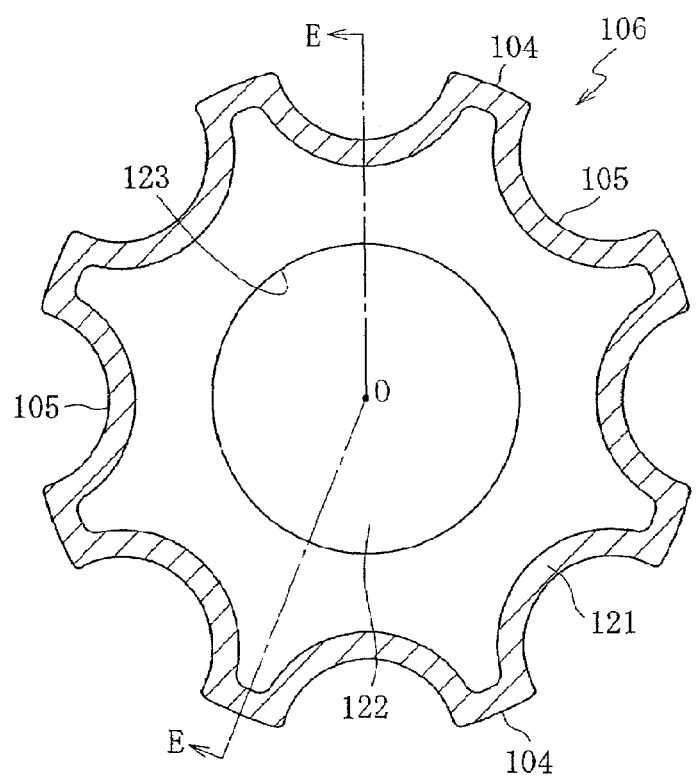
FIG. 8 shows a conventional example of the inner ring and is a cross-sectional view taken along the line F-F in FIG. 9.
Figure 9:
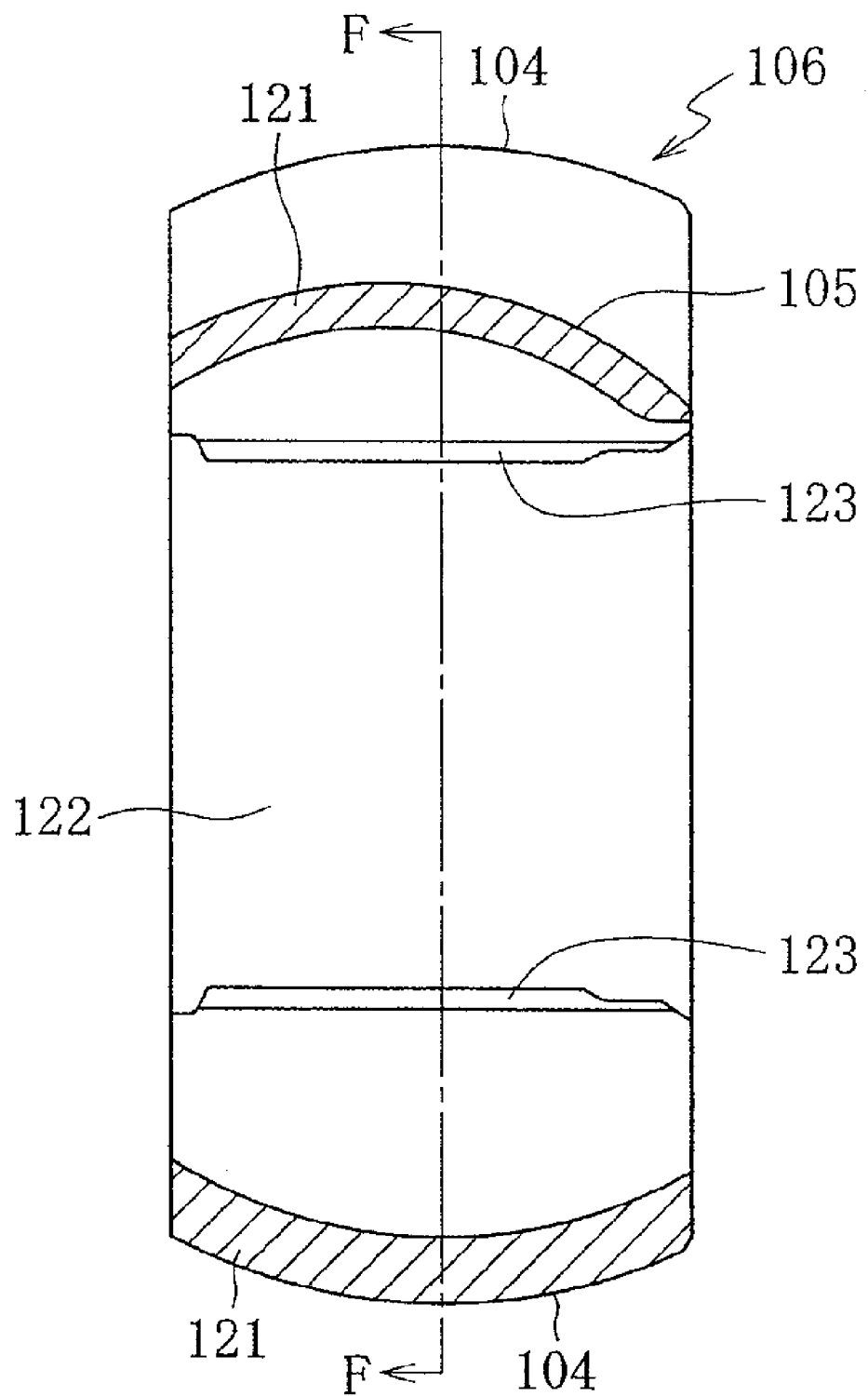
FIG. 9 is a cross-sectional view taken along the line E-O-E in FIG. 8.

A constant velocity universal joint of an embodiment shown in FIGS. 6 and 7 is configured to include: an outer ring 3 serving as an outer member and having curved track grooves 2 formed axially in its spherical inner diameter surface 1; an inner ring 6 serving as an inner member and having curved track grooves 5 formed axially in its spherical outside diameter surface 4; eight torque transmission balls 7 arranged in respective ball tracks each constituted by one of the track grooves 2 of the outer ring 3 in combination with the corresponding track groove 5 of the inner ring 6; and a retainer 9 having pockets 8 for holding these balls 7. The eight balls 7 are retained in the respective pockets 8 formed in the retainer 9 and are arranged at regular intervals in the circumferential direction.

The center of curvature $O_1$ of each of the track grooves 2 of the outer ring 3 and the center of curvature $O_2$ of the corresponding track groove 5 of the inner ring 6 are axially offset in respective opposite directions by the same distance with respect to a joint central surface O including the center of the ball 7. Therefore, each of the ball tracks has a wedge-like shape in which the width is large at an opening side and gradually decreases toward an inner side. The spherical centers of the inner diameter surface 1 of the outer ring 3 and the outside diameter surface 4 of the inner ring 6 are coincident with the joint central surface O. If the constant velocity universal joint having the abovementioned configuration is employed in a drive shaft of an automobile, a shaft portion 11 (a driven shaft) integrally extending from the bottom portion of a mouth portion 10 of the outer ring 3 is connected to a wheel-bearing apparatus (not shown). In addition, a shaft 12 (a driving shaft) spline-fitted into a shaft hole 22 of the inner ring 6 is connected to a sliding-type constant velocity universal joint (not shown).

This constant velocity universal joint has a structure in which torque can be transmitted between two shafts, i.e., the shaft portion 11 of the outer ring 3 and the shaft 12 in the side of the inner ring while operational angular displacement between the two shafts is allowed. Specifically, when the outer ring 3 is angularly displaced with respect to the inner ring 6 by an angle θ, each of the balls 7 guided by the retainer 9 is always held in a plane (at θ/2) bisecting the operational angle θ at any operational angle, thereby ensuring the constant velocity characteristics of the joint.

In the connection structure of the inner ring 6 and the shaft 12 as described above, female spline portions 23 are axially formed in the inner diameter surface of the shaft hole 22 of the inner ring 6, and male spline portions 24 are axially formed in the outside diameter surface of the shaft 12. The shaft 12 is inserted into the shaft hole 22 of the inner ring 6 to engage the female spline portion 23 of the inner ring 6 with the male spline portion 24 of the shaft 12, whereby the shaft 12 is spline-fitted into the inner ring 6 so as to be capable of transmitting torque.

A snap ring 26 fitted into an annular groove 25 provided in the end portion of the shaft 12 is locked to a step portion 27 provided in an inner end portion of the shaft hole 22 of the inner ring 6. In this manner, the shaft 12 inserted into the shaft hole 22 of the inner ring 6 to spline-fit is prevented from being disconnected.

Figure 1:
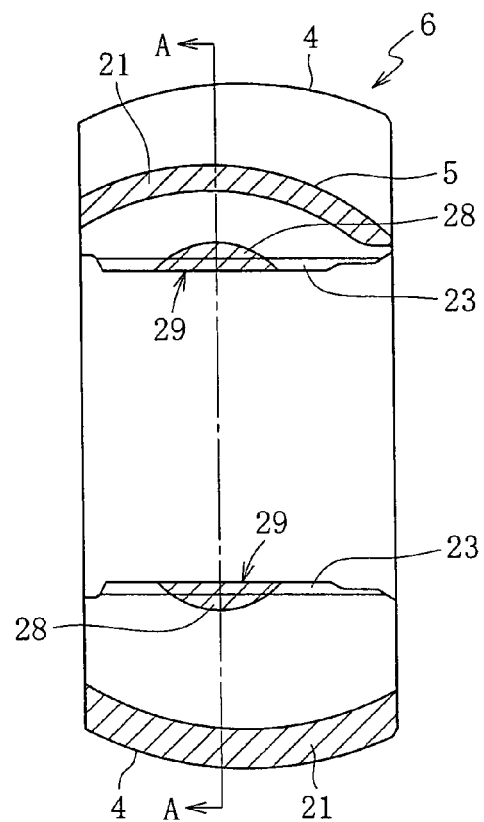
FIG. 1 is a cross-sectional view taken along the line B-O-B in FIG. 2, illustrating an inner ring of an embodiment of the present invention, the inner ring having a hardened layer in an axial central portion of a female spline portion of a shaft hole.
Figure 2:
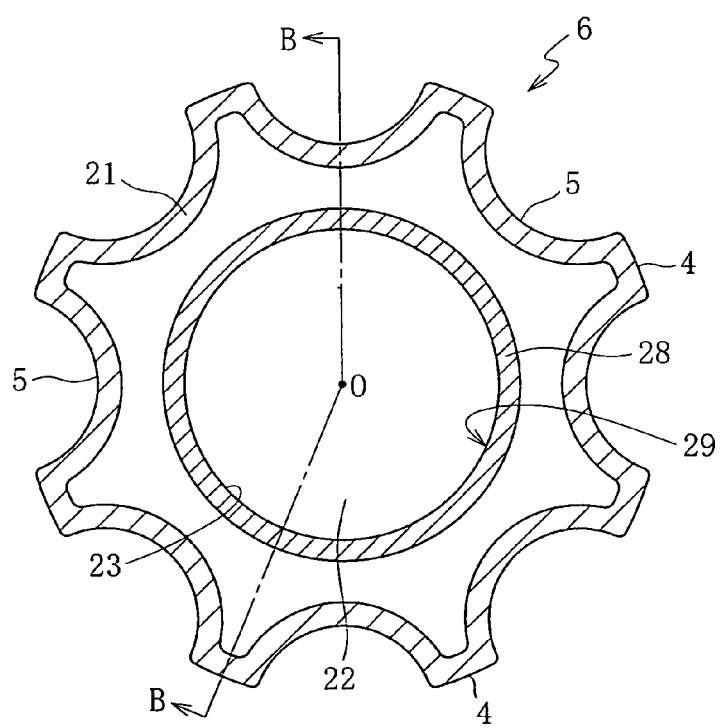
FIG. 2 is a cross-sectional view taken along the line A-A in FIG. 1, illustrating an example of a formation pattern of the hardened layer.

The inner ring 6 of this constant velocity universal joint is made of a steel material, such as carbon steel for machine construction, to which hardening processing can be applied by means of induction quenching. As shown in FIGS. 1 and 2, in the inner ring 6, a hardened layer 21 is formed by induction quenching in the outside diameter surface 4 contacting the inner diameter surface of the retainer 9 and in the track grooves 5 on which a high contact pressure is exerted due to the rolling motion of the ball 7. In addition, a hardened layer 28 is formed by the induction quenching in an axial central portion 29 of the female spline portion 23 of the shaft hole 22. In the female spline portion 23 of the shaft hole 22 of the inner ring 6, the hardened layer 28 by means of the induction quenching is not formed in both axial side portions which are the remaining portion of the female spline portion 23 other than the axial central portion 29.

FIG. 1 is a cross-sectional view taken along the line B-O-B in FIG. 2, and FIG. 2 is a cross-sectional view taken along the line A-A in FIG. 1. In FIG. 2, hatching for indicating the cross-sections is omitted, and hatching indicates portions in which the hardened layers 21 and 28 are formed.

Figure 3:
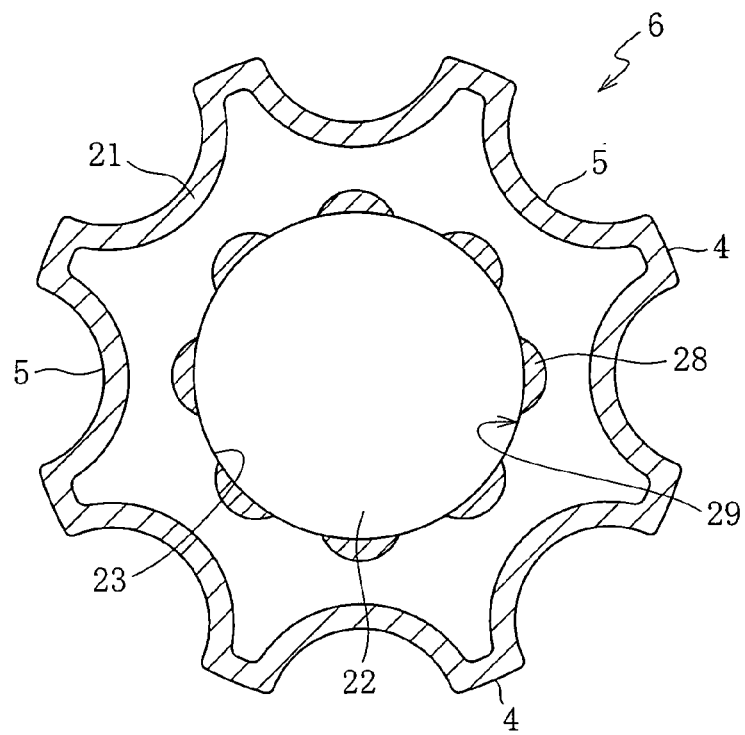
FIG. 3 is a modified example of FIG. 2, illustrating another example of the formation pattern of the hardened layer.

The hardened layer 28 formed in the axial central portion 29 of the female spline portion 23 of the shaft hole 22 of the inner ring 6 can be formed in the entire circumference along the circumferential direction as shown in FIG. 2 or can be discontinuously formed along the circumferential direction as shown in FIG. 3. The hardened layer 28 shown in FIG. 3 is an example of a plurality of the hardened layers discontinuously formed along the circumferential direction at regular intervals.

Figure 4:
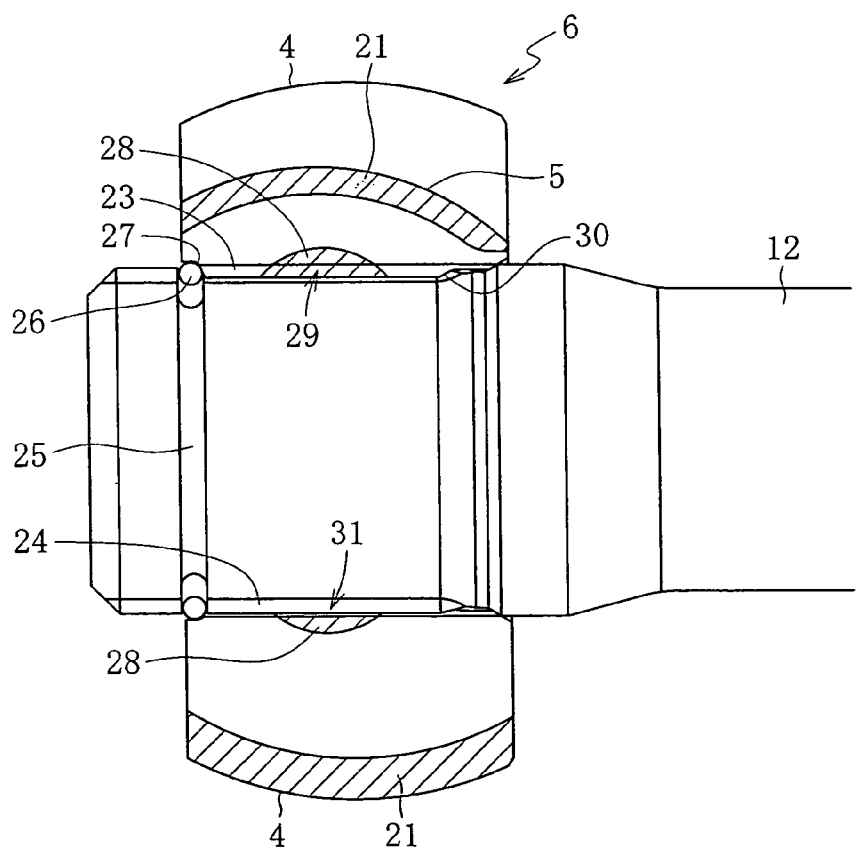
FIG. 4 is a cross-sectional view illustrating a state in which the inner ring of FIG. 1 is spline-fitted to a shaft.

For the structure in which the inner ring 6 is spline-fitted to the shaft 12 as in this constant velocity universal joint, when twist torque is applied to the shaft 12, stress is concentrated on the spline base portion 30 of the shaft 12 which portion serves as a fulcrum for the twist (see FIG. 4). Furthermore, when a shaft 12 having a twist angle additionally provided to the male spline portion 24 is employed in order to suppress the occurrence of backlash when the inner ring 6 and the shaft 12 are in a spline-fitted state, the stress is further concentrated on the spline base portion 30 of the shaft 12. The twist strength is lowered due to this stress concentration. Furthermore, when the twist angle is additionally provided, since the twist angle is asymmetric in the directions of twist, the condition of the stress concentration differs depending on the twist direction. Therefore, the strength against twist is large in a particular direction and is low in another particular direction.

Hence, as shown in FIG. 1, in the inner ring 6 of this embodiment, the hardened layer 28 by means of heat treatment is formed only in the axial central portion 29 of the shaft hole 22. In addition, the hardened layer 28 is not formed in the both axial side portions which are the remaining portion of the female spline portion 23 other than the axial central portion 29. In this manner, the stress concentration is relaxed in the spline base portion 30 of the shaft 12. Specifically, by subjecting only the axial central portion 29 of the shaft hole 22 of the inner ring 6 to heat treatment, martensitic transformation induced by the heat treatment occurs in the axial central portion 29, and thus, the volume of the axial central portion 29 is expanded to cause the inner diameter at the female spline portion therein to decrease.

Figure 5A:
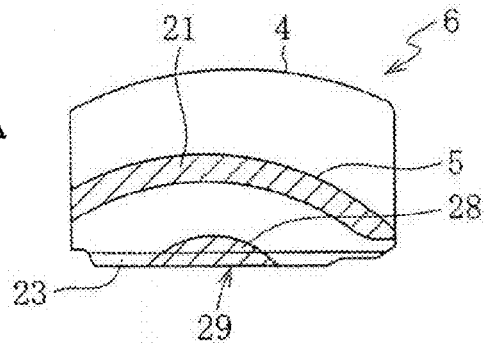
FIG. 5A is a cross-sectional view schematically illustrating part of the inner ring of FIG. 1.
Figure 5B:
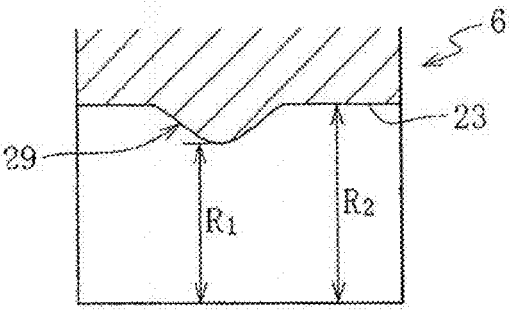
FIG. 5B illustrates the female spline portion formed in the shaft hole of the inner ring.

Therefore, as shown in FIGS. 5A and 5B, the inner diameter $R_1$ at the female spline portion 23 in the axial central portion 29 becomes smaller than the inner diameter $R_2$ at the female spline portion 23 in both the axial side portions. Therefore, the female spline portion 23 is brought to a state in which part thereof is swelled inwardly in the axial central portion 29. In this state, if the shaft 12 is inserted into the shaft hole 22 of the inner ring 6, the shaft 12 is brought to a press-fitted state in the axial central portion 29 since the inner diameter $R_1$ at the female spline portion 23 in the axial central portion 29 is small. Therefore, when twist torque is applied, stress is concentrated on two points, i.e., a spline central portion 31 (a portion corresponding to the axial central portion 29 of the shaft hole 22 of the inner ring 6) in addition to the spline base portion 30 of the shaft 12. Since the stress concentration is dispersed to the two points, the stress concentration can be relaxed.

Furthermore, the inner ring 6 has a shape having the spherical outside diameter surface 4 as described above, i.e., a shape in which the axial central portion has a large thickness and both the axial side portions have a small thickness. In the conventional case, stress is concentrated on the spline base portion 30 of the shaft 12, which portion corresponds to one of the axial side portions having a small thickness. On the other hand, in this embodiment, the axial central portion 29 on which the stress is concentrated has the largest thickness. Therefore, the strength of the inner ring 6 can be ensured.

In addition, since the inner diameter is small in the axial central portion 29 of the female spline portion 23 of the inner ring 6, the inner ring 6 and the shaft 12 are brought to a press-fitted state in the axial central portion 29 of the inner ring 6. Therefore, the backlash in the spline fit can be eliminated without additionally providing a twist angle to the shaft 12. By spline-fitting the shaft 12 in which a twist angle is not additionally provided into the inner ring 6, the strengths of the inner ring 6 and the shaft 12 are ensured, and at the same time the spline fit can be achieved in which the strength does not vary depending on the direction of twist. This is advantageous in terms of the reduction in the number of products and the productivity as compared to the conventional case (the means in which different twist angles are provided in the respective shaft splines of the left and right shafts).

What is claimed is:

1. An inner member for mounting in a constant velocity universal joint for transmitting torque while the inner member is allowed to be angularly displaced relative to an outer member and which is spline-fitted to a shaft inserted into a shaft hole formed through the inner member, the inner member comprising:
    a hardened layer formed by heat treatment only in an axial central portion of the female spline portion of the shaft hole.

2. An inner member according to claim 1, wherein
    the hardened layer is formed by heat treatment by means of induction quenching.

3. An inner member according to claim 2, wherein
    the hardened layer is formed discontinuously along a circumferential direction of the female spline portion of the shaft hole.

4. A constant velocity universal joint comprising an outer member, the inner member according to claim 3, and a torque transmission member intervening between the inner member and the outer member to transmit torque.

5. An inner member according to claim 2, wherein
    the hardened layer is formed over the entire circumference of the female spline portion.

6. A constant velocity universal joint comprising an outer member, the inner member according to claim 5, and a torque transmission member intervening between the inner member and the outer member to transmit torque.

7. A constant velocity universal joint comprising an outer member, the inner member according to claim 2, and a torque transmission member intervening between the inner member and the outer member to transmit torque.

8. An inner member according to claim 1, wherein
    the hardened layer is formed discontinuously along a circumferential direction of the female spline portion of the shaft hole.

9. A constant velocity universal joint comprising an outer member, the inner member according to claim 8, and a torque transmission member intervening between the inner member and the outer member to transmit torque.

10. An inner member according to claim 1, wherein
    the hardened layer is formed over the entire circumference of the female spline portion.

11. A constant velocity universal joint comprising an outer member, the inner member according to claim 10, and a torque transmission member intervening between the inner member and the outer member to transmit torque.

12. A constant velocity universal joint comprising an outer member, the inner member according to claim 1, and a torque transmission member intervening between the inner member and the outer member to transmit torque.

* * * * *